(12) United States Patent
Nishimura

(10) Patent No.: US 9,800,151 B2
(45) Date of Patent: Oct. 24, 2017

(54) CONVERTER

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Tsuguo Nishimura, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 6 days.

(21) Appl. No.: 14/784,325

(22) PCT Filed: Mar. 13, 2014

(86) PCT No.: PCT/JP2014/001419
§ 371 (c)(1),
(2) Date: Oct. 14, 2015

(87) PCT Pub. No.: WO2014/178162
PCT Pub. Date: Nov. 6, 2014

(65) Prior Publication Data
US 2016/0099641 A1    Apr. 7, 2016

(30) Foreign Application Priority Data
Apr. 30, 2013  (JP) ................................. 2013-095724

(51) Int. Cl.
G05F 1/00     (2006.01)
H02M 3/158    (2006.01)
(Continued)

(52) U.S. Cl.
CPC ............. *H02M 3/158* (2013.01); *H02M 1/36* (2013.01); *H02M 1/38* (2013.01); *H02M 3/1582* (2013.01)

(58) Field of Classification Search
CPC .. H02M 3/158; H02M 3/1588; H02M 3/1582; H02M 2001/0045; H02M 2001/0067
(Continued)

(56) References Cited

U.S. PATENT DOCUMENTS

2003/0042880 A1*  3/2003  Kataoka ............. H02M 3/1582
                                                  323/282
2004/0085048 A1   5/2004  Tateishi
(Continued)

FOREIGN PATENT DOCUMENTS

| CN | 105122618 A | 12/2015 |
|---|---|---|
| EP | 1 289 106 A1 | 3/2003 |
| JP | 2012-205427 A | 10/2012 |

OTHER PUBLICATIONS

Jul. 30, 2014 International Search Report issued in International Patent Application No. PCT/JP2014/001419.

*Primary Examiner* — Adolf Berhane
*Assistant Examiner* — Afework Demisse
(74) *Attorney, Agent, or Firm* — Oliff PLC (57) ABSTRACT

In a converter, the source of a first FET and the drain of a second FET are connected to one end of an inductor while the source of a third FET and the drain of a fourth FET are connected to the other end of the inductor. The sources of the first FET and the second FET are connected to each other. The cathode and the anode of a diode are connected respectively to the drain and the source of the third FET. Then, the first FET, the second FET, the third FET and the fourth FET are turned ON/OFF individually so that a voltage applied by a battery is converted. When voltage conversion is to be terminated, OFF-state of the third FET is maintained. Then, (Continued)

during the time that the OFF-state of the third FET is maintained, an electric current is reduced that flows from the drain of the third FET through a storage battery to the source of the fourth FET.

4 Claims, 5 Drawing Sheets

(51) Int. Cl.
*H02M 1/36* (2007.01)
*H02M 1/38* (2007.01)

(58) Field of Classification Search
USPC .......................................................... 323/271
See application file for complete search history.

(56) References Cited

U.S. PATENT DOCUMENTS

| 2007/0290667 | A1 |   | 12/2007 | Nagai et al. |
| 2008/0203990 | A1 |   | 8/2008 | Nishida |
| 2013/0249621 | A1 | * | 9/2013 | Gagne ................. H03K 17/063 |
|   |   |   |   | 327/408 |
| 2016/0043641 | A1 |   | 2/2016 | Nishimura |

* cited by examiner

CONVERTER

This application is the national phase under 35 U.S.C. §371 of PCT International Application No. PCT/JP2014/001419 which has an International filing date of Mar. 13, 2014 and designated the United States of America.

FIELD

The present invention relates to a converter stepping up and down an applied voltage so as to convert the voltage.

BACKGROUND

Presently, vehicles are spread that incorporate a storage battery in addition to a battery. Such a vehicle incorporates a converter stepping up and down the output voltage of the battery so as to convert the output voltage and then applying the converted voltage on the storage battery.

A converter known in conventional art is a converter comprising: an inductor; a first switch and a second switch, one end of each of which is connected to one end of the inductor; a third switch, one end of which is connected to the other end of the inductor; and a fourth switch, one end and the other end of which are connected respectively to the other ends of the inductor and the second switch, and turning ON/OFF individually the first switch, the second switch, the third switch and the fourth switch so as to convert a voltage between the other ends of the first switch and the second switch.

In this converter of conventional art, a battery is connected between the other ends of the first switch and the second switch and a storage battery is connected between the other ends of the third switch and the fourth switch. Then, the first switch, the second switch, the third switch, and the fourth switch are turned ON/OFF individually so that the output voltage of the battery is converted. Then, the converted voltage is outputted to the storage battery.

When the output voltage of the battery is to be stepped down, in a state that the third switch and the fourth switch are maintained at ON and OFF respectively, transition is made alternately between a state that the first switch and the second switch are ON and OFF and a state that the first switch and the second switch are OFF and ON.

Here, when the second switch is turned ON for the purpose of stepping down the output voltage of the battery, a possibility arises that an electric current flows from the storage battery, that is, from the output side of the voltage, to the inductor so that the output voltage of the battery is not appropriately converted.

As such, a converter capable of avoiding adverse flow of an electric current from the output side of the voltage to the inductor is disclosed in Japanese Patent Application Laid-Open No. 2012-205427.

In the converter described in Japanese Patent Application Laid-Open No. 2012-205427, semiconductor switches are employed for the first switch, the second switch, the third switch, and the fourth switch. Then, a parasitic diode is connected between both ends of each of the first switch, the second switch, the third switch, and the fourth switch. In one parasitic diode, the anode is connected to one end of the third switch and the cathode is connected to the other end of the third switch.

In the converter described in Japanese Patent Application Laid-Open No. 2012-205427, when the output voltage of the battery is to be stepped down, in a state that the third switch is maintained at OFF, the first switch, the second switch, and the fourth switch are turned ON/OFF individually so that the output voltage is converted. Thus, the parasitic diode prevents adverse flow of an electric current from the storage battery to the battery.

SUMMARY

Nevertheless, in the converter described in Japanese Patent Application Laid-Open No. 2012-205427, during the time that the output voltage of the battery is converted, an electric current continues to flow through the parasitic diode to the storage battery. Thus, a problem arises that a large loss in the electric power is caused by a voltage drop in the parasitic diode.

The present invention has been devised in view of this situation, with focusing attention on the fact that during the time that a sufficient electric current flows from the application side of a voltage to an inductor, no electric current flows adversely from the output side of the voltage to the inductor, an object thereof is to provide a converter capable of avoiding adverse flow of an electric current from an output side of a voltage to an inductor and having a small loss in the electric power.

The converter according to the present invention comprises: an inductor; a first switch and a second switch, one end of each of which is connected to one end of the inductor; a third switch, one end of which is connected to the other end of the inductor; and a fourth switch connected between the other ends of the inductor and the second switch, and turns ON/OFF individually the first switch, the second switch, the third switch and the fourth switch so as to convert a voltage applied between the other ends of the first switch and the second switch. The converter further comprises: a diode, anode and cathode of which are connected respectively to one end and the other end of the third switch; and maintaining means for maintaining OFF-state of the third switch when conversion of the voltage is to be terminated. In the converter, during a time that the maintaining means maintains OFF-state of the third switch, an electric current is reduced that flows between the other end of the third switch and the second-switch-side one end of the fourth switch.

In the present invention, one end of each of the first switch and the second switch is connected to one end of the inductor while the other end of the inductor is connected to one end of each of the third switch and the fourth switch. The other end of the second switch is connected to the other end of each of the fourth switch. Further, the anode and the cathode of the diode are connected respectively to one end and the other end of the third switch.

For example, when the battery is connected between the other ends of the first switch and the second switch and the storage battery is connected between the other ends of the third switch and the fourth switch, the first switch, the second switch, the third switch, and the fourth switch are turned ON/OFF so that the output voltage of the battery is converted and then the converted voltage is outputted to the storage battery.

During the time that the first switch, the second switch, the third switch, and the fourth switch are turned ON/OFF individually so that the voltage applied between the other ends of the first switch and the second switch is converted, a sufficient electric current flows from the battery, that is, from the application side of the voltage, to the inductor. Thus, although the second switch and the third switch are ON, no electric current flows from the output side of the voltage to the inductor. Further, no electric current flows through the diode and hence the loss in the electric power is small.

When conversion of the voltage applied between the other ends of the first switch and the second switch is to be terminated, OFF-state of the third switch is maintained. During the time that OFF-state of the third switch is maintained so that adverse flow of an electric current from the storage battery, that is, from the output side of the voltage, to the inductor is prevented, the electric current that flows between the other end of the third switch and the second-switch-side one end of the fourth switch is reduced. By virtue of this, even when the electric current that flows from the application side of the voltage to the inductor is reduced so that voltage conversion is terminated, adverse flow of an electric current from the output side of the voltage to the inductor is avoided.

The converter according to the present invention comprises: first ON/OFF means for turning ON/OFF the first switch and the second switch complementarily; second ON/OFF means for turning ON/OFF the third switch and the fourth switch complementarily; first adjustment means for adjusting, in correspondence to large/small of a value concerning the electric current, a duty of ON/OFF of the first switch to be small/large; and second adjustment means for adjusting, in correspondence to large/small of a value concerning the electric current, a duty of ON/OFF of the fourth switch to be small/large. In the converter, when the conversion of the voltage is to be terminated, the maintaining means maintains the OFF-state of the third switch with priority over the complementary ON/OFF of the third switch and the fourth switch performed by the second ON/OFF means. The duty of ON/OFF of each of the first switch and the fourth switch is reduced so that the electric current is reduced.

In the present invention, the first switch and the second switch are turned ON/OFF complementarily and the third switch and the fourth switch are turned ON/OFF complementarily. For example, in a case that the battery is connected between the other ends of the first switch and the second switch and the storage battery is connected between the other ends of the third switch and the fourth switch, when the first switch and the second switch are ON and OFF respectively, an electric current flows through the inductor so that energy is accumulated in the inductor. Then, when transition has occurred from a state that the first switch and the second switch are ON and OFF respectively to a state that the first switch and the second switch are OFF and ON respectively, the electric current that flows through the inductor stops. Thus, in order to maintain the electric current that flows through the inductor, the inductor releases the accumulated energy and hence an electric current flows from the inductor to the storage battery. As the energy of the inductor decreases in association with the release, the electric current that flows between the other end of the third switch and the second-switch-side one end of the fourth switch decreases so that the voltage applied by the battery is stepped down and converted. At that time, the voltage step-down width becomes larger when the duty of ON/OFF of the first switch becomes smaller. The converted voltage is applied on the storage battery.

Further, when the third switch and the fourth switch are OFF and ON respectively, a large amount of electric current flows from the battery to the inductor so that energy is accumulated in the inductor. Then, when transition has occurred from a state that the third switch and the fourth switch are OFF and ON respectively to a state that the third switch and the fourth switch are ON and OFF respectively, the electric current that flows through the inductor is reduced because the electric current flows also through the storage battery. At that time, in order to maintain the electric current that flows through the inductor, the inductor releases the accumulated energy so as to, with adopting as a reference the voltage at the first-switch-side one end of the inductor, step up the voltage at the other end on the third switch side. As a result, the voltage applied by the battery is stepped up and converted. At that time, the voltage step-up width becomes smaller when the duty of ON/OFF of the fourth switch becomes smaller. The converted voltage is applied on the storage battery.

The duty of ON/OFF of each of the first switch and the fourth switch is adjusted to be small/large in correspondence to the large/small of the value concerning the electric current that flows between the other end of the third switch and the second-switch-side one end of the fourth switch. Thus, when the electric current that flows between the other end of the third switch and the second-switch-side one end of the fourth switch becomes larger, the duty of ON/OFF of each of the first switch and the fourth switch becomes smaller so that the voltage step-down width of the voltage applied by the battery becomes larger and the voltage step-up width becomes smaller. Thus, the electric current that flows between the other end of the third switch and the second-switch-side one end of the fourth switch becomes smaller. Further, when the electric current that flows between the other end of the third switch and the second-switch-side one end of the fourth switch becomes smaller, the duty of ON/OFF of each of the first switch and the fourth switch becomes larger so that the voltage step-down width of the voltage applied by the battery becomes smaller and the voltage step-up width becomes larger. Thus, the electric current that flows between the other end of the third switch and the second-switch-side one end of the fourth switch becomes larger. Therefore, the electric current that flows between the other end of the third switch and the second-switch-side one end of the fourth switch is maintained at constant.

When conversion of the voltage is to be terminated, OFF-state of the third switch is maintained with priority over the complementary ON/OFF of the third switch and the fourth switch. In a state that the third switch is OFF, the fourth switch is turned ON/OFF. Then, the duty of ON/OFF of each of the first switch and the fourth switch is reduced so that the electric current is reduced as described above.

In the converter according to the present invention, during the time that the conversion is terminated, the first switch and the third switch are maintained at OFF.

In the present invention, during the time that conversion of the voltage is terminated, the first switch and the third switch are maintained at OFF. This prevents a situation that an electric current flows from the application side of the voltage to the inductor and a situation that an electric current flows from the output side of the voltage to the inductor. Further, adverse flow of an electric current from the output side of the voltage to the inductor is prevented.

In the converter according to the present invention, the timing of switching of the ON/OFF of the first switch and the second switch is adjusted so that no time period is present that the first switch and the second switch are both ON.

In the present invention, the timing of switching of the ON/OFF of the first switch and the second switch is adjusted so that no time period is present that the first switch and the second switch are both ON. Thus, a short circuit between the other ends of the first switch and the second switch is prevented.

In the converter according to the present invention, the timing of switching of the ON/OFF of the third switch and the fourth switch is adjusted so that no time period is present that the third switch and the fourth switch are both ON.

In the present invention, the timing of switching of the ON/OFF of the third switch and the fourth switch is adjusted so that no time period is present that the third switch and the fourth switch are both ON. Thus, a short circuit between the other ends of the third switch and the fourth switch is prevented.

According to the present invention, the first switch, the second switch, the third switch, and the fourth switch are turned ON/OFF individually so that the voltage is converted. When conversion of the voltage is to be terminated, in a state that the third switch is maintained at OFF, the electric current that flows between one end of the third switch and the second-switch-side one end of the fourth switch is reduced. This prevents adverse flow of an electric current from the output side of the voltage to the inductor and the loss in the electric power is small.

The above and further objects and features will move fully be apparent from the following detailed description with accompanying drawings.

DETAILED DESCRIPTION OF NON-LIMITING EXAMPLE EMBODIMENTS

The present invention is described below in detail with reference to the drawings illustrating embodiments.

Embodiment 1

Figure 1:
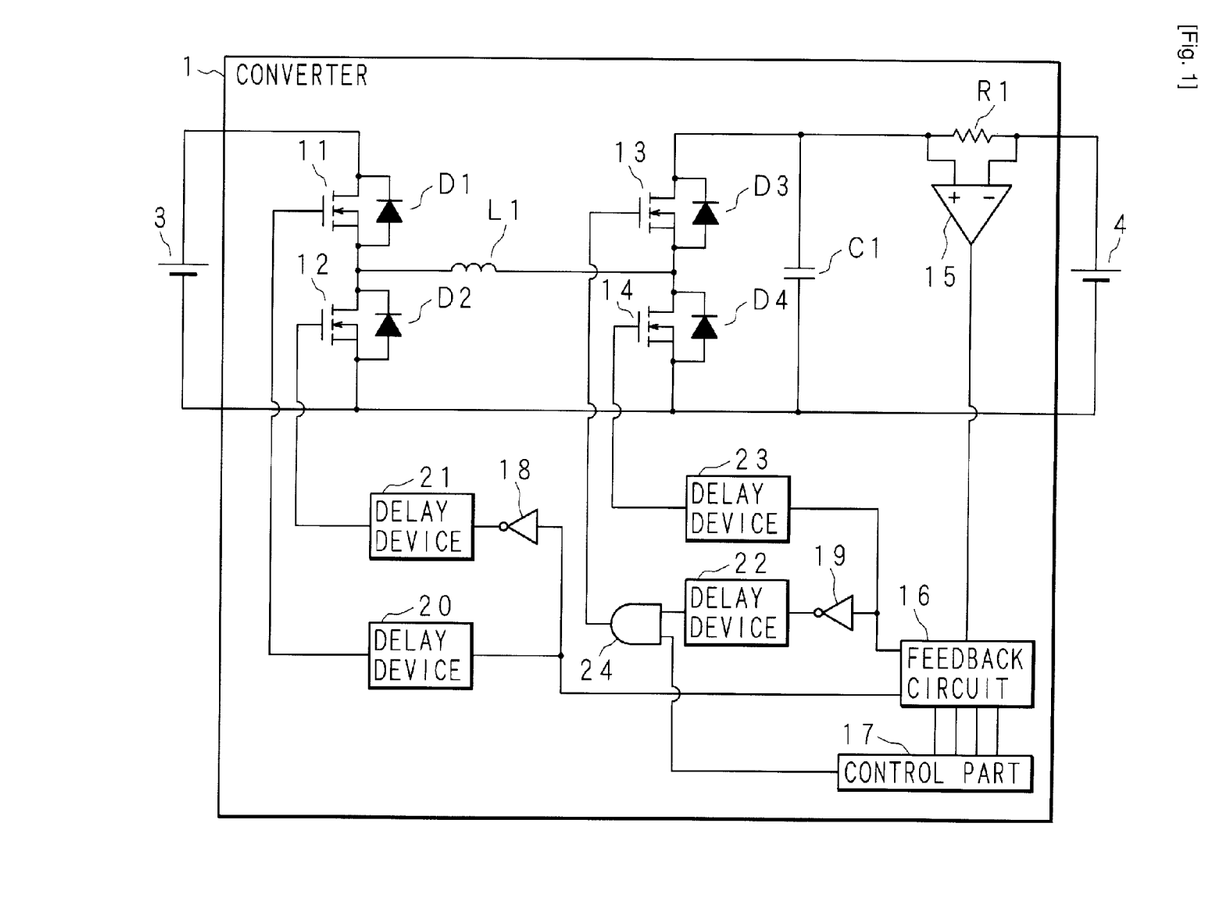
FIG. 1 is a circuit diagram of a converter according to Embodiment 1.

FIG. 1 is a circuit diagram of a converter 1 according to Embodiment 1. The converter 1 is suitably mounted on a vehicle and is connected individually to the positive terminal and the negative terminal of a battery 3 and to the positive terminal and the negative terminal of a storage battery 4. The converter 1 steps up and down the voltage applied by the battery 3 so as to convert the voltage and then applies the converted voltage on the storage battery 4. As a result, the storage battery 4 is charged.

The converter 1 includes N-channel type FETs (Field Effect Transistors) 11, 12, 13, and 14, a differential amplifier 15, a feedback circuit 16, a control part 17, inverters 18 and 19, delay devices 20, 21, 22, and 23, an AND circuit 24, a capacitor C1, diodes D1, D2, D3, and D4, an inductor L1, and a resistor R1.

The drain of the FET 11 is connected to the positive terminal of the battery 3 and the source of the FET 12 is connected to the negative terminal of the battery 3. The source of the FET 11 and the drain of the FET 12 are connected to one end of the inductor L1. The other end of the inductor L1 is connected to the source of the FET 13 and the drain of the FET 14. The sources of the FETs 12 and 14 are connected to each other. As such, the FET 14 is connected between the other end of the inductor L1 and the source of the FET 12.

The drains of the FETs 11, 12, 13, and 14 are connected respectively to the cathodes of the diodes D1, D2, D3, and D4 while the sources of the FETs 11, 12, 13, and 14 are connected respectively to the anodes of the diodes D1, D2, D3, and D4. The diodes D1, D2, D3, and D4 are parasitic diodes of the FETs 11, 12, 13, and 14 respectively.

The drain of the FET 13 is connected to one end of each of the capacitor C1 and the resistor R1. The other end of the resistor R1 is connected to the positive terminal of the storage battery 4. The source of the FET 14 is further connected to the other end of the capacitor C1 and the negative terminal of the storage battery 4. One end and the other end of the resistor R1 are connected respectively to the plus terminal and the minus terminal of the differential amplifier 15 while the output terminal of the differential amplifier 15 is connected to the feedback circuit 16.

In addition to the differential amplifier 15, the feedback circuit 16 is connected to the control part 17, the input terminals of the inverters 18 and 19, and the delay devices 20 and 23. The output terminals of the inverters 18 and 19 are connected respectively to the delay devices 21 and 22. The delay devices 20, 21, and 23 are connected respectively to the gates of the FETs 11, 12, and 14. The control part 17 and the delay device 22 are connected respectively to the two input terminals of the AND circuit 24. The output terminal of the AND circuit 24 is connected to the gate of the FET 13.

The FETs 11, 12, 13, and 14 serve as the first switch, the second switch, the third switch, and the fourth switch respectively. Each of the FETs 11, 12, 13, and 14 is turned ON when a voltage at or more than a predetermined voltage is applied on the gate and hence an electric current flows between the drain and the source in each of the FETs 11, 12, 13 and 14. Each of the FETs 11, 12, 13 and 14 is turned OFF when the voltage applied on the gate is less than the predetermined voltage and hence no electric current flows between the drain and the source in each of the FETs 11, 12, 13 and 14.

In the converter 1, the FETs 11, 12, 13, and 14 are turned ON/OFF individually so that the voltage applied between the drain of the FET 11 and the source of the FET 12 by the battery 3 is converted. The converted voltage is outputted from the drain of the FET 13 and the source of the FET 14. The outputted voltage is smoothed by the capacitor C1 and then applied through the resistor R1 on the storage battery 4.

The differential amplifier 15 amplifies the voltage applied between the plus terminal and the minus terminal, that is, the voltage across the resistor R1, and then outputs the amplified voltage through the output terminal to the feedback circuit 16. The voltage across the resistor R1 is proportional to the magnitude of the electric current that flows through the resistor R1. Thus, the voltage outputted by the differential amplifier 15 becomes high/low in correspondence to the large/small of the output electric current that flows through the resistor R1 to the storage battery 4.

A voltage corresponding to the output electric current is inputted from the differential amplifier 15 to the feedback circuit 16 and a reference voltage Vr and two triangular waves W1 and W2 are inputted from the control part 17 to the feedback circuit 16. On the basis of the voltage inputted from the differential amplifier 15 and the reference voltage Vr inputted from the control part 17, the feedback circuit 16 generates thresholds V1 and V2.

In accordance with the relation between the generated threshold V1 and the triangular wave W1, the feedback circuit 16 outputs a voltage of high level or low level to the input terminal of the inverter 19 and to the delay device 23. The voltages of high level and low level are constant and the voltage of high level is higher than the voltage of low level.

Further, in accordance with the relation between the generated threshold V2 and the triangular wave W2, the feedback circuit 16 outputs a voltage of high level or low level to the input terminal of the inverter 18 and to the delay device 20.

Each of the inverters 18 and 19 outputs a voltage of low level through the output terminal, when a voltage of high level is inputted from the feedback circuit 16 to the input terminal. Each of the inverter 18 and 19 outputs a voltage of high level through the output terminal, when a voltage of low level is inputted from the feedback circuit 16 to the input terminal.

A voltage of high level or low level is inputted from the feedback circuit 16 to each of the delay device 20 and 23 and a voltage of high level or low level is inputted from each of the inverters 18 and 19 to each of the delay devices 21 and 22. When a voltage of high level is inputted, each of the delay devices 20, 21, 22, and 23 outputs a voltage of high level. When a voltage of low level is inputted, each of the delay devices 20, 21, 22 and 23 outputs a voltage of low level. In the delay devices 20, 21, 22, and 23, a time delay is provided from the time that the voltage of high level or low level is inputted to the time that the voltage of high level or low level is outputted. This adjusts the timing of outputting the voltage of high level or low level.

In the AND circuit 24, an adverse-flow prevention signal composed of voltages of high level and low level is inputted from the control part 17 to one input terminal. In the AND circuit 24, a voltage of high level or low level is inputted from the delay device 22 to the other input terminal. When the inputted adverse-flow prevention signal is at a voltage of high level, the AND circuit 24 outputs the voltage of high level or low level inputted from the delay device 22, intact through the output terminal. Further, when the inputted adverse-flow prevention signal is at a voltage of low level, the AND circuit 24 outputs a voltage of low level through the output terminal regardless of the voltage inputted from the delay device 22.

Each of the delay devices 20, 21, and 23 outputs a voltage of high level or low level to each of the gates of the FETs 11, 12, and 14. The AND circuit 24 outputs a voltage of high level or low level through the output terminal to the gate of the FET 13.

In each of the FETs 11, 12, 13, and 14, when a voltage of high level is outputted to the gate, a voltage at or more than a predetermined voltage is applied on the gate so that each of the FETs 11, 12, 13 and 14 is turned ON. In each of the FETs 11, 12, 13 and 14, when a voltage of low level is outputted to the gate, a voltage less than the predetermined voltage is applied on the gate so that each of the FETs 11, 12, 13 and 14 is turned OFF.

By virtue of the operation of the inverter 18, the FETs 11 and 12 are turned ON/OFF complementarily. Specifically, when the FET 11 is ON, the FET 12 is OFF. When the FET 11 is OFF, the FET 12 is ON.

Further, when the adverse-flow prevention signal inputted to one terminal of the AND circuit 24 is at a voltage of high level, the FETs 13 and 14 are turned ON/OFF complementarily. Specifically, when the FET 13 is ON, the FET 14 is OFF. When the FET 13 is OFF, the FET 14 is ON.

Each of the delay devices 20 and 21 adjusts the time delay. Therefore, the timing of switching of the ON/OFF of the FETs 11 and 12 is adjusted so that no time period is present that the FETs 11 and 12 are both ON. Further, each of the delay device 22 and 23 also adjusts the time delay so that no time period is present that the FETs 13 and 14 are both ON. This prevents a short circuit between the drain of the FET 11 and the source of the FET 12 and a short circuit between the drain of the FET 13 and the source of the FET 14.

As described above, in correspondence to the voltage inputted from the differential amplifier 15 and to the reference voltage Vr and the triangular waves W1 and W2 inputted from the control part 17, the feedback circuit 16 outputs voltages of high level or low level so as to turns ON/OFF the FETs 11 and 12 complementarily and turn ON/OFF the FETs 13 and 14 complementarily. The feedback circuit 16 serves as the first ON/OFF section and the second ON/OFF section.

The control part 17 outputs the reference voltage Vr and the triangular waves W1 and W2 to the feedback circuit 16 and outputs the adverse-flow prevention signal to one terminal of the AND circuit 24.

Figure 2:
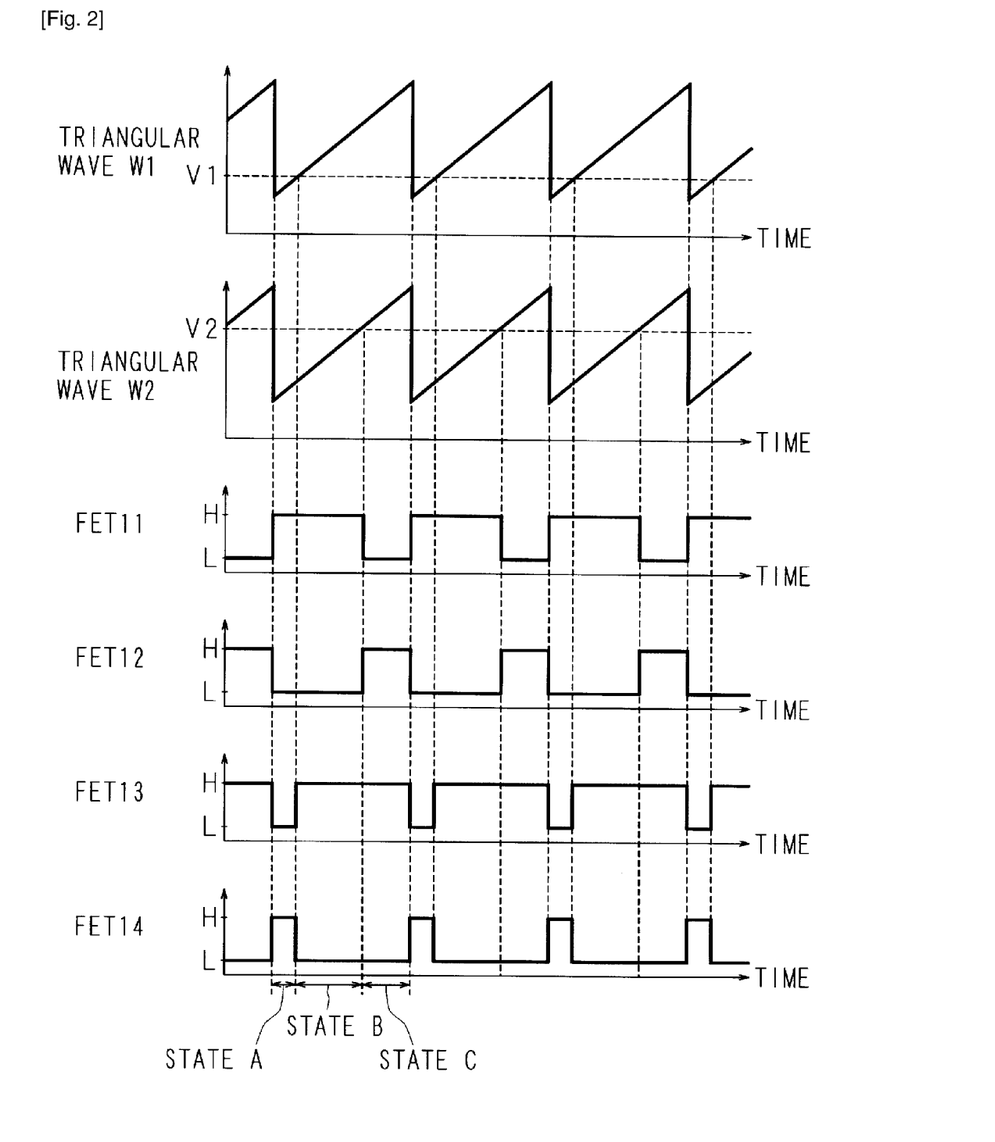
FIG. 2 is a timing chart used for describing the operation of a converter.

FIG. 2 is a timing chart used for describing the operation of the converter 1. In the description of the operation of the converter 1 given below, the adverse-flow prevention signal inputted to one input terminal of the AND circuit 24 is premised to be at high level. FIG. 2 illustrates: transition of the triangular waves W1 and W2 outputted from the control part 17 to the feedback circuit 16; and transition of the voltages applied on the gates of the FETs 11, 12, 13, and 14. In FIG. 2, "H" indicates a voltage of high level and "L" indicates a voltage of low level.

Each of the triangular waves W1 and W2 outputted from the control part 17 to the feedback circuit 16 has a waveform in which a moderate rise of voltage and a rapid fall of voltage are repeated periodically, which is referred to as a sawtooth wave. The triangular waves W1 and W2 have the same time point of start of voltage rise, and the period of each of the triangular waves W1 and W2 is constant.

During the time that the voltage of the triangular wave W1 is less than the generated threshold V1, the feedback circuit 16 outputs a voltage of high level to the input terminal of the inverter 19 and to the delay device 23. Thus, in the FET 13, a voltage of low level is applied on the gate so that the FET 13 is turned OFF. Further, in the FET 14, a voltage of high level is applied on the gate so that the FET 14 is turned ON.

During the time that the voltage of the triangular wave W1 is at or more than the generated threshold V1, the feedback circuit 16 outputs a voltage of low level to the input terminal of the inverter 19 and to the delay device 23. Thus, in the FET 13, a voltage of high level is applied on the gate so that the FET 13 is turned ON. Further, in the FET 14, a voltage of low level is applied on the gate so that the FET 14 is turned OFF.

During the time that the voltage of the triangular wave W2 is less than the generated threshold V2, the feedback circuit 16 outputs a voltage of high level to the input terminal of the inverter 18 and to the delay device 20. Thus, in the FET 11, a voltage of high level is applied on the gate so that the FET 11 is turned ON. Further, in the FET 12, a voltage of low level is applied on the gate so that the FET 12 is turned OFF.

During the time that the voltage of the triangular wave W2 is at or more than the generated threshold V2, the feedback circuit 16 outputs a voltage of low level to the input terminal of the inverter 18 and to the delay device 20. Thus, in the FET 11, a voltage of low level is applied on the gate so that the FET 11 is turned OFF. Further, in the FET 12, a voltage of high level is applied on the gate so that the FET 12 is turned ON.

The triangular waves W1 and W2 outputted from the control part 17 to the feedback circuit 16 have periodic waveforms. Thus, a periodic pulse voltage composed of voltages of high level and low level is applied on the gate of each of the FETs 11, 12, 13, and 14. The duty of the pulse voltage is determined in correspondence to the thresholds V1 and V2 generated by the feedback circuit 16. The duty of the pulse voltage applied on the FET 14, that is, the fraction of the duration that the FET 14 is ON within one cycle, becomes large/small in correspondence to the high/low of the threshold V1. The duty of the pulse voltage applied on the FET 11, that is, the fraction of the duration that the FET 11 is ON within one cycle, becomes large/small in correspondence to the high/low of the threshold V2.

As described above, when the FETs 11, 12, 13, and 14 are turned ON/OFF, the FETs 11, 12, 13, and 14 transit between a plurality of ON/OFF states. In Embodiment 1, as seen from FIG. 2, the FETs 11, 12, 13, and 14 sequentially transit between state A in which the FETs 11, 12, 13, and 14 are ON, OFF, OFF, and ON, state B in which the FETs 11, 12, 13, and 14 are ON, OFF, ON, and OFF, and state C in which the FETs 11, 12, 13, and 14 are OFF, ON, ON, and OFF.

When the FETs 11, 12, 13, and 14 are in state A, an electric current flows from the positive terminal of the battery 3 through the FET 11, the inductor L1, and the FET 14 in this order and then returns to the negative terminal of the battery 3. During this time, a large amount of electric current flows through the inductor L1 so that energy is accumulated.

When the ON/OFF state of the FETs 11, 12, 13, and 14 has transited from state A to state B, the electric current flows from the positive terminal of the battery 3 through the FET 11, the inductor L1, the FET 13, the resistor R1, and the storage battery 4 in this order and then returns to the negative terminal of the battery 3. In state B, in comparison with the electric current that flows when the ON/OFF state of the FETs 11, 12, 13, and 14 is of state A, the electric current flows through the resistor R1 and the storage battery 4 so that the electric current that flows through the inductor L1 is reduced.

At that time, the inductor L1 releases the accumulated energy in order to maintain the electric current that flows through itself. Thus the inductor L1 steps up, with adopting as a reference the voltage at one end on the FET 11 side, the voltage at the other end on the FET 13 side. As a result, the voltage between the drain of the FET 13 and the source of the FET 14 is stepped up and then the stepped-up voltage is applied through the resistor R1 on the storage battery 4. By virtue of this step-up, the amount of the electric current that flows through the resistor R1 rises.

After that, as the energy of the inductor L1 is released, the voltage on the other end on the FET 13 side falls gradually. When the ON/OFF state of the FETs 11, 12, 13, and 14 is of state B, an electric current flows through the inductor L1 by virtue of the battery 3 and hence a certain amount of energy is accumulated in the inductor L1.

When the ON/OFF state of the FETs 11, 12, 13, and 14 has transited from state B to state C, the electric current from the battery 3 to the inductor L1 stops. Thus, the inductor L1 releases the energy in order to maintain the electric current that flows through itself. As a result, the electric current flows from the inductor L1 through the FET 13, the resistor R1, the storage battery 4, and the FET 12 in this order and then returns to the inductor L1.

As the energy of the inductor L1 decreases in association with the release, the amount of the electric current that returns from the drain of the FET 13 through the resistor R1 and the storage battery 4 to the source of the FET 14 decreases so that the voltage between the drain of the FET 13 and the source of the FET 14 is stepped down.

The voltage stepped up and down in accordance with ON/OFF of the FETs 11, 12, 13, and 14 is smoothed by the capacitor C1 and then the smoothed voltage is applied through the resistor R1 on the storage battery 4.

When the ON/OFF state of the FETs 11, 12, 13, and 14 transits repeatedly in the order of states A, B, and C, the voltage applied by the battery 3 on the converter 1 is converted and then the converted voltage is applied on the storage battery 4.

In a case that the ON/OFF state of the FETs 11, 12, 13, and 14 transits repeatedly in the order of states A, B, and C, when the duration of state A becomes longer, the step-up width of the voltage becomes larger and the output electric current that flows through the resistor R1 to the storage battery 4 becomes larger. When the duration of state C becomes longer, the voltage step-down width of the voltage becomes larger and the output electric current becomes smaller.

In the feedback circuit 16, when the voltage outputted from the differential amplifier 15 and proportional to the output electric current becomes lower, the thresholds V1 and V2 become higher. Thus, the duration of state A becomes longer and the duration of state C becomes shorter. Accordingly, the step-up width of the voltage between the drain of the FET 13 and the source of the FET 14 becomes larger and the voltage step-down width of the voltage becomes smaller so that the amount of the electric current that flows through the resistor R1 increases.

Further, in the feedback circuit 16, when the voltage outputted from the differential amplifier 15 and proportional to the output electric current becomes higher, the thresholds V1 and V2 become lower. Thus, the duration of state A becomes shorter and the duration of state C becomes longer. Accordingly, the step-up width of the voltage between the drain of the FET 13 and the source of the FET 14 becomes smaller and the voltage step-down width of the voltage becomes larger so that the amount of the electric current that flows through the resistor R1 decreases.

As described above, in response to the large/small of the value concerning the output electric current, that is, the voltage outputted from the differential amplifier 15, the thresholds V1 and V2 become low/high respectively so that the feedback circuit 16 adjusts the duty of ON/OFF of each of the FETs 11 and 14 to be small/large. The feedback circuit 16 serves also as the first adjustment section and the second adjustment section.

When the threshold V1 falls and becomes less than the minimum of the triangular wave W1, voltages of high level and low level are always applied on the gates of the FETs 13 and 14 respectively so that the FETs 13 and 14 are maintained at ON and OFF. Thus, the FETs 11, 12, 13, and 14 transit repeatedly in the order of states B and C so that voltage step-down alone is performed.

When the threshold V2 rises and becomes more than or equal to the maximum of the triangular wave W2, voltages of high level and low level are always applied on the gates of the FETs 11 and 12 respectively so that the FETs 11 and 12 are maintained at ON and OFF. Thus, the FETs 11, 12, 13, and 14 transit repeatedly in the order of states A and B so that voltage step-up alone is performed.

When both the thresholds V1 and V2 becomes less than the minimums of the triangular waves W1 and W2, a voltage of low level is always applied on the gates of the FETs 11 and 14 so that the FETs 11 and 14 are both maintained at OFF. Further, a voltage of high level is always applied on the gates of the FETs 12 and 13 so that the FETs 12 and 13 are both maintained at ON.

Figure 3:
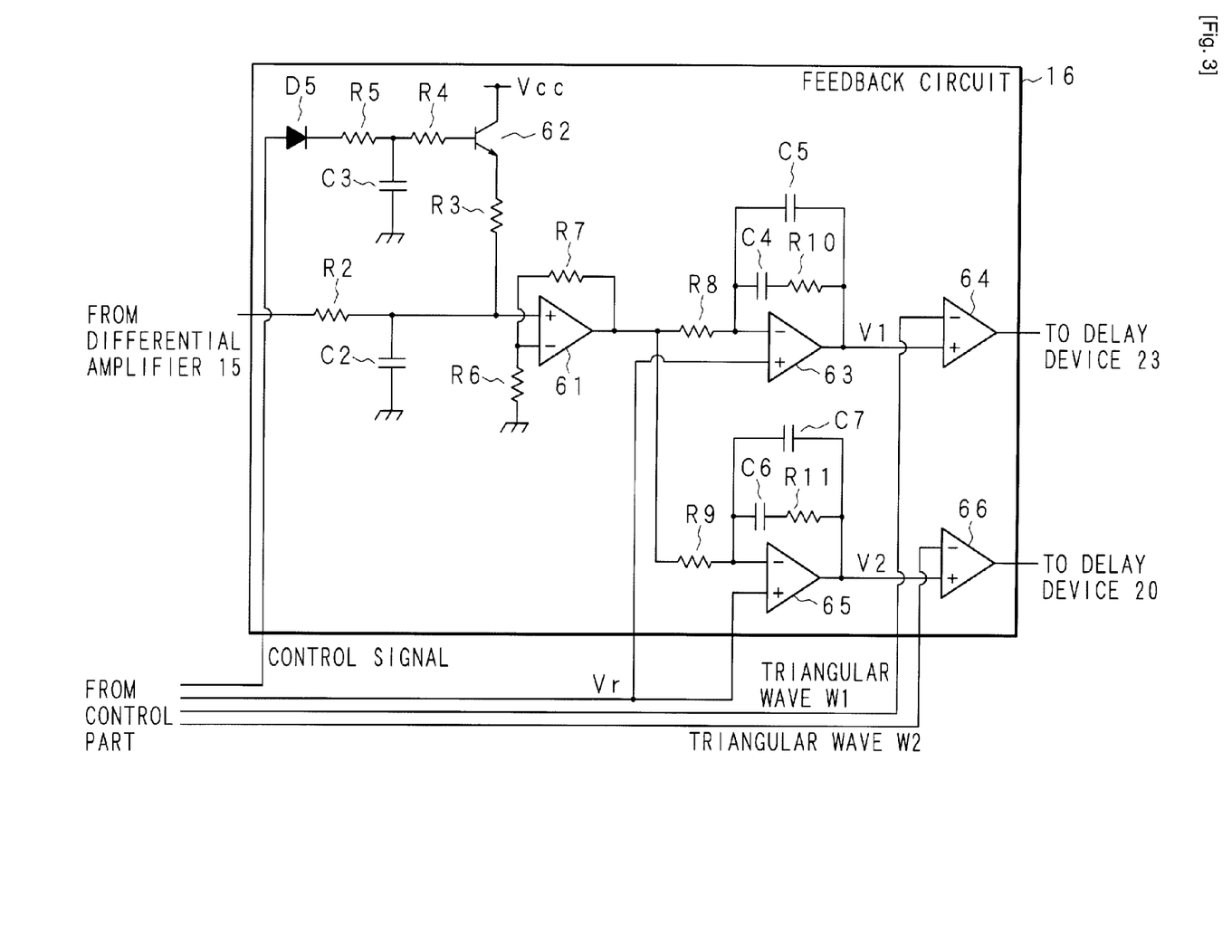
FIG. 3 is a circuit diagram of a feedback circuit.

FIG. 3 is a circuit diagram of the feedback circuit 16. The feedback circuit 16 includes differential amplifiers 61, 63, and 65, an NPN-type bipolar transistor 62, comparators 64 and 66, capacitors C2, C3, . . . , C7, a diode D5, and resistors R2, R3, . . . , R11.

In the feedback circuit 16, the output terminal of the differential amplifier 15 is connected to one end of the resistor R2. The other end of the resistor R2 is connected to one end of each of the capacitor C2 and the resistor R3 and to the plus terminal of the differential amplifier 61. The other end of the resistor R3 is connected to the emitter of the bipolar transistor 62. A constant voltage Vcc is applied on the collector of the bipolar transistor 62. The base of the bipolar transistor 62 is connected to one end of the resistor R4. The other end of the resistor R4 is connected to one end of each of the capacitor C3 and the resistor R5. The other end of the resistor R5 is connected to the cathode of the diode D5 and the anode of the diode D5 is connected to the control part 17.

The minus terminal of the differential amplifier 61 is connected to one end of each of the resistors R6 and R7. The other end of resistor R7 is connected to the output terminal of the differential amplifier 61. The other end of each of the capacitors C2 and C3, and the resistor R6 is grounded. The output terminal of the differential amplifier 61 is connected further to one end of each of the resistors R8 and R9.

The other end of the resistor R8 is connected to the minus terminal of the differential amplifier 63 and to one end of each of the capacitors C4 and C5. The other end of the capacitor C4 is connected to one end of the resistor R10 while the other end of each of the capacitor C5 and the resistor R10 is connected to the output terminal of the differential amplifier 63. The plus terminal of the differential amplifier 63 is connected to the plus terminal of differential amplifier 65 and to the control part 17.

The output terminal of the differential amplifier 63 is further connected to the plus terminal of the comparator 64. The minus terminal of the comparator 64 is connected to the control part 17. The output terminal of the comparator 64 is connected to the delay device 23. The output terminal of the comparator 64 is connected to the input terminal of the inverter 19 in addition to the delay device 23.

The other end of the resistor R9 is connected to the minus terminal of the differential amplifier 65 and to one end of each of the capacitors C6 and C7. The other end of the capacitor C6 is connected to one end of the resistor R11 while the other end of each of the capacitor C7 and the resistor R11 is connected to the output terminal of the differential amplifier 65. The output terminal of the differential amplifier 65 is further connected to the plus terminal of the comparator 66. The minus terminal of the comparator 66 is connected to the control part 17. The output terminal of the comparator 66 is connected to the delay device 20. The output terminal of the comparator 66 is connected to the input terminal of the inverter 18 in addition to the delay device 20.

The voltage outputted by the differential amplifier 15 is inputted through the resistor R2 to the plus terminal of the differential amplifier 61. The capacitor C2 is provided for stabilizing the voltage inputted to the plus terminal of the differential amplifier 61.

The differential amplifier 61 and the resistors R6 and R7 serve as an amplifier and amplify the voltage inputted to the plus terminal of the differential amplifier 61 and then inputs the amplified voltage through the resistor R8 to the minus terminal of the differential amplifier 63. The amplifier constructed from the differential amplifier 61 and the resistors R6 and R7, similarly, inputs the amplified voltage through the resistor R9 to the minus terminal of the differential amplifier 65.

The reference voltage Vr is inputted from the control part 17 to the plus terminal of the differential amplifier 63. The differential amplifier 63, the capacitors C4 and C5, and the resistors R8 and R10 serve as an error amplifier and amplify the difference between the reference voltage Vr inputted to the plus terminal of the differential amplifier 63 and the voltage inputted to the minus terminal of the differential amplifier 63. The gain of this error amplifier is different depending on the frequency of the difference of the voltages applied on the plus terminal and the minus terminal of the differential amplifier 63. That is, the gain for low-frequency components is large and the gain for high frequency components is small. This achieves suppression of noise components present in the high frequency domain.

The error amplifier constructed from the differential amplifier 63, the capacitors C4 and C5 and the resistors R8 and R10 amplifies the difference so as to generate the threshold V1 and then inputs the generated threshold V1 through the output terminal of the differential amplifier 63 to the plus terminal of the comparator 64.

When the voltage inputted to the minus terminal of the differential amplifier 63 relative to the reference voltage Vr inputted to the plus terminal is lower, the threshold V1 is higher. Further, when the voltage inputted to the minus terminal of the differential amplifier 63 relative to the reference voltage Vr is higher, the threshold V1 is lower.

In the comparator 64, during the time that the voltage of the triangular wave W1 inputted to the minus terminal is less than the threshold V1 inputted to the plus terminal, the comparator 64 outputs a voltage of high level through the output terminal to the input terminal of the inverter 19 and to the delay device 23. In the comparator 64, during the time that the voltage of the triangular wave W1 inputted to the minus terminal is at or more than the threshold V1 inputted to the plus terminal, the comparator 64 outputs a voltage of low level through the output terminal to the input terminal of the inverter 19 and to the delay device 23.

The reference voltage Vr is inputted from the control part 17 to the plus terminal of the differential amplifier 65. The differential amplifier 65, the capacitors C6 and C7, and the resistors R9 and R11 serve as an error amplifier and amplify the difference between the reference voltage Vr inputted to the plus terminal of the differential amplifier 65 and the voltage inputted to the minus terminal of the differential amplifier 65. The gain of this error amplifier is different depending on the frequency of the difference of the voltages applied on the plus terminal and the minus terminal of the differential amplifier 65. That is, the gain for low-frequency components is large and the gain for high frequency components is small. This achieves suppression of noise components present in the high frequency domain.

The error amplifier constructed from the differential amplifier 65, the capacitors C6 and C7 and the resistors R9 and R11 amplifies the difference so as to generate the threshold V2 and then inputs the generated threshold V2 through the output terminal of the differential amplifier 65 to the plus terminal of the comparator 66.

When the voltage inputted to the minus terminal of the differential amplifier 65 relative to the reference voltage Vr inputted to the plus terminal is lower, the threshold V2 is higher. Further, when the voltage inputted to the minus terminal of the differential amplifier 65 relative to the reference voltage Vr is higher, the threshold V2 is lower.

In the comparator 66, during the time that the voltage of the triangular wave W2 inputted to the minus terminal is less than the threshold V2 inputted to the plus terminal, the comparator 66 outputs a voltage of high level through the output terminal to the input terminal of the inverter 18 and to the delay device 20. In the comparator 66, during the time that the voltage of the triangular wave W2 inputted to the minus terminal is at or more than the threshold V2 inputted to the plus terminal, the comparator 66 outputs a voltage of low level through the output terminal to the input terminal of the inverter 18 and to the delay device 20.

In the bipolar transistor 62, the resistance between the collector and the emitter becomes small/large in correspondence to the high/low of the voltage applied on the base. The control signal composed of voltages of high level and low level is inputted, through the diode D5 and the resistors R4 and R5, to the base of the bipolar transistor 62. The diode D5 prevents a situation that an electric current flows from the capacitor C3 to the control part 17.

When the control signal inputted from the control part 17 is at a voltage of low level, a sufficiently low voltage is applied on the base of the bipolar transistor 62. At that time, the resistance between the collector and the emitter in the bipolar transistor 62 is sufficiently large in comparison with the resistance of each of the resistors R2 and R3. Thus, when the control signal is at a voltage of low level, the voltage outputted by the differential amplifier 15 through the output terminal is applied on the positive terminal of the differential amplifier 61.

When the control signal inputted from the control part 17 is switched from a voltage of low level to a voltage of high level, the electric current flows from the control part 17 through the diode D5 and the resistor R5 into the capacitor C3 so that electric charge is accumulated on the capacitor C3. As a result, the voltage applied on the gate of the bipolar transistor 62 rises gradually in accordance with a time constant determined by the capacitance of the capacitor C3 and the resistance of the resistor R5.

In association with the rise of the voltage applied on the base of the bipolar transistor 62, the resistance between the collector and the emitter of the bipolar transistor 62 falls gradually so that the voltage applied on the bipolar-transistor-62-side terminal of the resistor R3 rises. As a result, the positive terminal of the differential amplifier 61 receives a voltage obtained by dividing with the resistors R2 and R3 the difference voltage between the voltage applied on the bipolar-transistor-62-side terminal of the resistor R3 and the voltage outputted by the differential amplifier 15 through the output terminal. As the electric charge is accumulated on the capacitor C3, the voltage applied on the base of the bipolar transistor 62 rises so that also the voltage applied on the bipolar-transistor-62-side terminal of the resistor R3 rises. As a result, also the voltage inputted to the positive terminal of the differential amplifier 61 rises.

When the capacitor C3 has become fully charged, a sufficiently high voltage is applied on the base of the bipolar transistor 62. Thus, the resistance between the collector and the emitter of the bipolar transistor 62 is as small as negligible when compared with the resistances of the resistors R2 and R3. Thus, when the capacitor C3 has become fully charged, the positive terminal of the differential amplifier 61 receives a voltage obtained by dividing with the resistors R2 and R3 the difference voltage between the voltage Vcc and the voltage outputted through the output terminal of the differential amplifier 15. The voltage Vcc is sufficiently larger than the maximum voltage of the voltage outputted by the differential amplifier 15 through the output terminal. Thus, a sufficiently high voltage is inputted also to the positive terminal of the differential amplifier 61.

In the feedback circuit 16 constructed as described above, when the voltage inputted to the plus terminal of the differential amplifier 61 is the output voltage of the differential amplifier 15, the voltage outputted by the differential amplifier 15 is amplified by the amplifier constructed from the differential amplifier 61 and the resistors R6 and R7. Then, the amplified voltage is applied on the minus terminals of the differential amplifiers 63 and 65. As described above, the voltage outputted by the differential amplifier 15 becomes high/low in correspondence to the large/small of the output electric current that flows through the resistor R1. Thus, similarly, the voltage applied on the minus terminals of the differential amplifiers 63 and 65 becomes high/low in correspondence to the large/small of the output electric current.

When the voltage inputted to the minus terminal of the differential amplifier 63 becomes higher, the threshold V1 outputted by the differential amplifier 63 through the output terminal becomes lower. Thus, as described in the explanation of the operation of the converter 1 with reference to FIG. 2, the duration of state A becomes shorter so that the step-up width of the voltage between the drain of the FET 13 and the source of the FET 14 becomes smaller and hence the amount of the output electric current that flows through the resistor R1 to the storage battery 4 decreases.

When the voltage inputted to the minus terminal of the differential amplifier 63 becomes lower, the threshold V1 outputted by the differential amplifier 63 through the output terminal becomes higher. Thus, as described in the explanation of the operation of the converter 1 with reference to FIG. 2, the duration of state A becomes longer so that the step-up width of the voltage between the drain of the FET 13 and the source of the FET 14 becomes larger and hence the amount of the output electric current that flows through the resistor R1 to the storage battery 4 increases.

When the voltage inputted to the minus terminal of the differential amplifier 65 becomes higher, the threshold V2 outputted by the differential amplifier 65 through the output terminal becomes lower. Thus, as described in the explanation of the operation of the converter 1 with reference to FIG. 2, the duration of state C becomes longer so that the step-down width of the voltage between the drain of the FET 13 and the source of the FET 14 becomes larger and hence the amount of the output electric current that flows through the resistor R1 to the storage battery 4 decreases.

When the voltage inputted to the minus terminal of the differential amplifier 65 becomes lower, the threshold V2 outputted by the differential amplifier 65 through the output terminal becomes higher. Thus, as described in the explanation of the operation of the converter 1 with reference to FIG. 2, the duration of state C becomes shorter so that the step-down width of the voltage between the drain of the FET 13 and the source of the FET 14 becomes smaller and hence the amount of the output electric current that flows through the resistor R1 to the storage battery 4 increases.

When the voltage applied on the plus terminal of the differential amplifier 61 is the output voltage of the differential amplifier 15, the voltage step-up width is adjusted such that the voltage of the minus terminal of the differential amplifier 63 should become the reference voltage Vr outputted from the control part 17. Further, the voltage step-down width is adjusted such that the voltage of the minus terminal of differential amplifier 65 should become the reference voltage Vr outputted from the control part 17. Thus, the output electric current that flows through the resistor R1 is adjusted to the electric current determined by the reference voltage Vr outputted from the control part 17. When the reference voltage Vr becomes larger, the output electric current that flows from the resistor R1 is adjusted to a larger electric current.

When the control signal is at a voltage of high level so that a sufficiently large voltage is applied on the positive terminal of the differential amplifier 61 as described above, the voltage amplified by the amplifier constructed from the differential amplifier 61 and the resistors R6 and R7 and then applied on the minus terminals of the differential amplifiers 63 and 65 is sufficiently higher than the reference voltage Vr. Thus, the thresholds V1 and V2 outputted by the differential amplifiers 63 and 65 through the output terminals become both lower than the minimums of the triangular waves W1 and W2 outputted from the control part 17. As a result, as described in the explanation of the operation of the converter 1 with reference to FIG. 2, the FETs 11 and 14 both are turned OFF and the FETs 12 and 13 both are turned ON.

Figure 4:
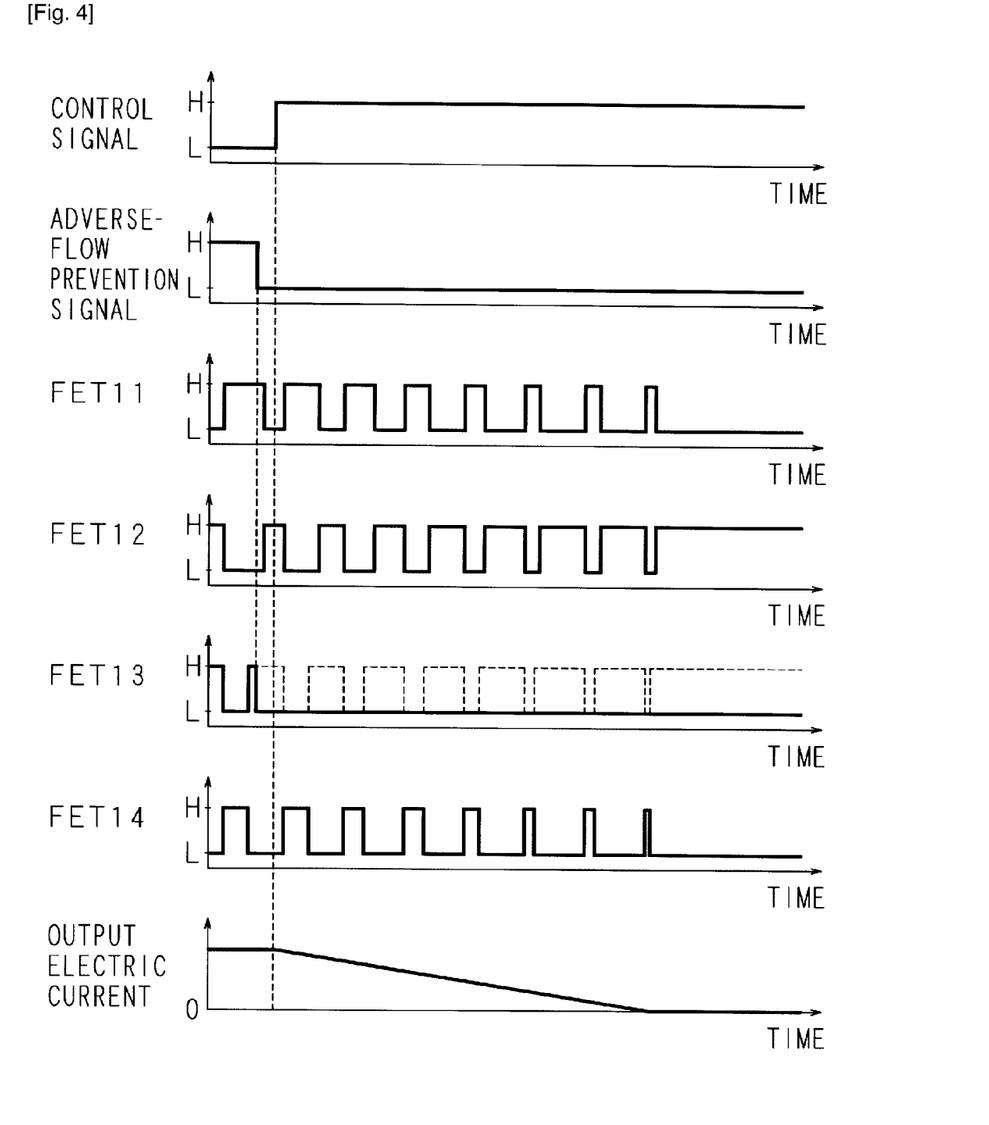
FIG. 4 is a timing chart used for describing the operation of termination of voltage conversion by a converter.

FIG. 4 is a timing chart used for describing the operation of termination of voltage conversion by the converter 1. FIG. 4 illustrates: the transition of the control signal and the adverse-flow prevention signal outputted from the control part 17; the transition of the voltages applied on the gates of the FETs 11, 12, 13, and 14; and the transition of the output electric current that flows through the resistor R1 to the storage battery 4.

When the FETs 11, 12, 13, and 14 are turned ON/OFF individually so that conversion of the voltage applied by the battery 3 is to be terminated, the control part 17 switches the adverse-flow prevention signal from a voltage of high level to a voltage of low level. By virtue of this, the AND circuit 24 outputs a voltage of low level through the output terminal. Then, during the time that the adverse-flow prevention signal is at a voltage of low level, the FET 13 is maintained at OFF so that adverse flow of an electric current from the storage battery 4 to the inductor L1 is prevented. As such, when conversion of the voltage applied by the battery 3 is to be terminated, the control part 17 switches the adverse-flow prevention signal from a voltage of high level to a voltage of low level so that maintains the FET 13 at OFF with priority over the complementary ON/OFF of the FETs 13 and 14 performed by the feedback circuit 16. Thus, the control part 17 serves as the maintaining section. Further, in FIG. 4, the dashed line indicates the transition of the voltage applied on the gate of the FET 13 when the adverse-flow prevention signal is at high level.

In a state that the adverse-flow prevention signal is maintained at low level, the control part 17 switches the control signal from a voltage of low level to a voltage of high level. After the control part 17 has switched the control signal from a voltage of low level to a voltage of high level, electric charge is accumulated on the capacitor C3. Thus, as described above, the voltage applied on the positive terminal of the differential amplifier 61 rises gradually. When the voltage applied on the positive terminal of the differential amplifier 61 rises, the voltage applied on the minus terminals of the differential amplifiers 63 and 65 rises gradually so that the thresholds V1 and V2, having been at or above the minimums and below the maximums of the triangular waves W1 and W2, fall gradually.

When the thresholds V1 and V2 begin falling, the state of the FETs 11, 12, and 14 transits in the order of a first state that the FETs 11, 12, and 14 are respectively ON, OFF, and ON, a second state that the FETs 11, 12, and 14 are respectively ON, OFF, and OFF, and a third state that the FETs 11, 12, and 14 are respectively OFF, ON, and OFF.

When the FETs 11, 12, and 14 are in the first state, the electric current flows from the positive terminal of the battery 3 through the FET 11, the inductor L1, and the FET 14 in this order and then returns to the negative terminal of the battery 3. During this time, energy is accumulated in the inductor L1. The first state corresponds to the state A.

When the FETs 11, 12, and 14 have transited from the first state to the second state, the electric current flows from the positive terminal of the battery 3 through the FET 11, the inductor L1, the diode D3, the resistor R1, and the storage battery 4 in this order and then returns to the negative terminal of the battery 3. The second state corresponds to the state B. When transition has occurred from the first state to the second state, similarly to the case of transition from state A to state B, the electric current that flows through the inductor L1 falls. Thus, the inductor L1 releases the energy so as to achieve step-up so that the output electric current that flows through the resistor R1 to the storage battery 4 rises. When the duration of the first state becomes longer, the voltage step-up width becomes larger and the width of increase of the output electric current becomes large.

After that, as the energy of the inductor L1 is released, the voltage on the other end on the FET 13 side falls gradually. When the ON/OFF state of the FETs 11, 12, 13, and 14 is of the second state, an electric current flows through the inductor L1 by virtue of the battery 3 and hence a certain amount of energy is accumulated in the inductor L1.

When the FETs 11, 12, and 14 have transited from the second state to the third state, the electric current from the battery 3 to the inductor L1 stops. Thus, in order to maintain the electric current that flows through the inductor, the inductor L1 releases the energy. Therefore, the electric current flows from the inductor L1 through the diode D3, the resistor R1, the storage battery 4, and the FET 12 in this order and then returns to the inductor L1. The third state corresponds to the state C.

As the energy of the inductor L1 decreases in association with the release, the voltage on the FET 13 side of the inductor L1 becomes lower and hence the voltage between the cathode of the diode D3 and the source of the FET 14 is stepped down. Thus, the electric current that flows through the resistor R1 to the storage battery 4 falls. When the duration of the third state becomes longer, the voltage step-down width becomes larger and the width of fall of the output electric current also becomes larger.

When the control part 17 has switched the control signal from a voltage of low level to a voltage of high level, as described above, electric charge is accumulated on the capacitor C3 so that the thresholds V1 and V2 fall gradually. As the thresholds V1 and V2 fall gradually, the duty of ON/OFF of each of the FETs 11 and 14 becomes smaller and the duty of ON/OFF of the FET 12 becomes larger. As a result, the first state becomes shorter and the duration of the third state becomes longer. Thus, the voltage step-up width gradually becomes smaller and the voltage step-down width gradually becomes larger. Accordingly, the output electric current that returns from the drain of the FET 13 through the resistor R1 and the storage battery 4 to the source of the FET 14 decreases gradually.

As described above, in the converter 1, the FETs 11, 12, 13, and 14 are turned ON/OFF individually so that the voltage applied by the battery 3 is converted. Then, in the converter 1, when conversion of the voltage is to be terminated, the control part 17 switches the adverse-flow prevention signal to a voltage of low level so as to maintain the OFF-state of the FET 13. During the time that the OFF-state of the FET 13 is maintained, the control part 17 switches the control signal from a voltage of low level to a voltage of high level so as to reduce the duty of ON/OFF of each of the FETs 11 and 14 and thereby decreases the output electric current that flows from the drain of the FET 13 through the resistor R1 and the storage battery 4 to the source of the FET 14.

During the time that voltage conversion is performed, a sufficient electric current flows from the battery 3 to the inductor L1. Thus, no electric current flows adversely from the storage battery 4, that is, from the output side of the voltage, to the inductor L1. Further, since no electric current flows through the diode D3, the loss in the electric power is small. Further, when voltage conversion is to be terminated, in a state that the FET 13 is turned OFF, the electric current that flows from the battery 3, that is, from the application side of the voltage, to the inductor L1 is reduced.

If, in a state that the FET 13 is not maintained at OFF, the output electric current that flows from the drain of the FET 13 through the resistor R1 and the storage battery 4 to the source of the FET 14 were reduced, the duration that the FETs 11, 12, 13, and 14 are respectively OFF, ON, ON and OFF would gradually become longer as illustrated in FIG. 4. Then, during the time that the FETs 11, 12, 13, and 14 are respectively OFF, ON, ON and OFF, when the amount of the output electric current becomes less than a constant value, a possibility would arise that the electric current flows adversely from the positive terminal of the storage battery 4 through the resistor R1 and the FET 13 to the inductor L1. If the electric current flowed adversely from the storage battery 4 through the resistor R1 and the FET 13 to the inductor L1, a possibility would arise that the output voltage of the battery 3 is not converted appropriately and the electric power of the storage battery 4 is consumed uselessly.

However, in the converter 1, when voltage conversion is to be terminated, the electric current that flows from the battery 3 to the inductor L1 is reduced in a state that the FET 13 is turned OFF. Thus, no electric current flows adversely from the storage battery 4, that is, from the output side of the voltage, to the inductor L1 and hence the electric power of the storage battery 4 is not uselessly consumed.

Further, during the time that voltage conversion is terminated, the control part 17 maintains the adverse-flow prevention signal at a voltage of low level and maintains the control signal at high level so as to maintain the FETs 11, 13, and 14 at OFF. This prevents a situation that an electric current flows from the battery 3 to the inductor L1 and a situation that an electric current flows from the storage battery 4 to the inductor L1.

Figure 5:
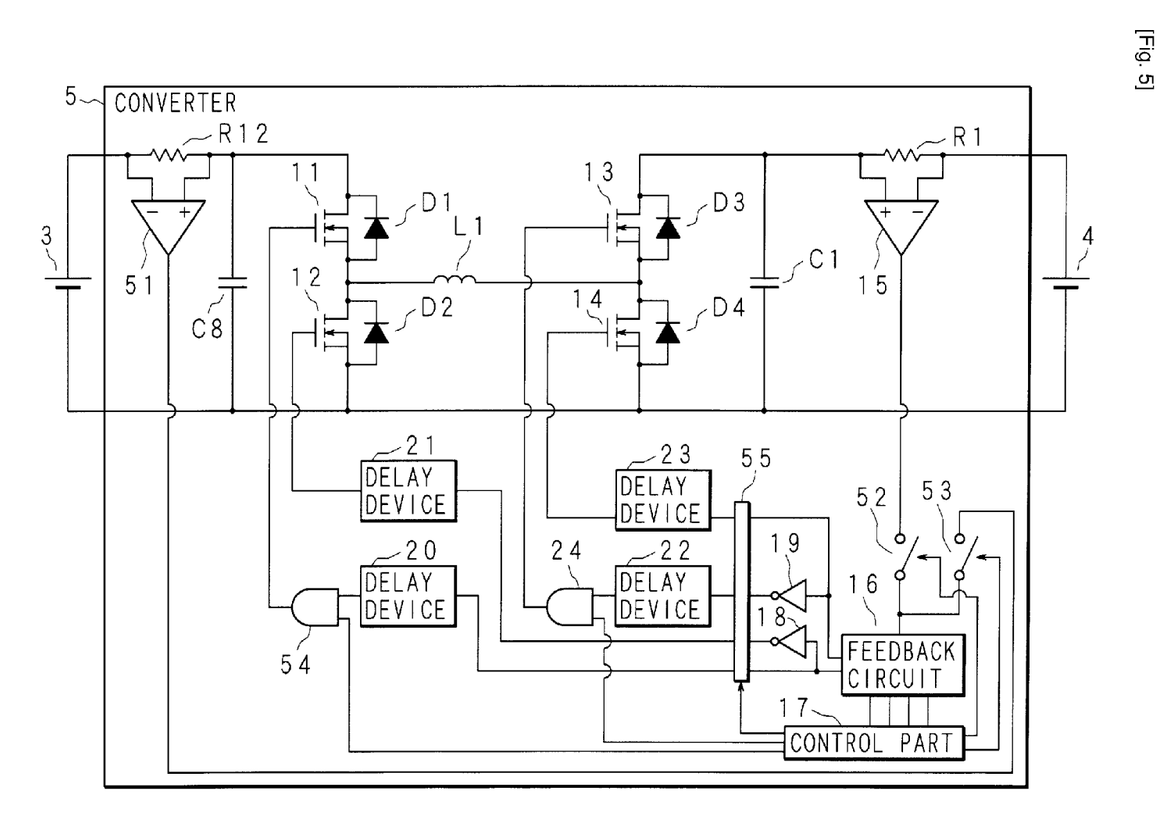
FIG. 5 is a circuit diagram of a converter according to Embodiment 2.

FIG. 5 is a circuit diagram of a converter 5 according to Embodiment 2. Similarly to the converter 1 according to Embodiment 1, the converter 5 is connected individually to the positive terminal and the negative terminal of the battery 3 and to the positive terminal and the negative terminal of a storage battery 4. Similarly to the converter 1 according to Embodiment 1, the converter 5 converts the voltage applied by the battery 3 and then applies the converted voltage on the storage battery 4. Further, the converter 5 converts the voltage applied by the storage battery 4 and then applies the converted voltage on the battery 3.

The following description is given for difference points of the converter 5 according to Embodiment 2 from the converter 1 according to Embodiment 1. Like configuration components in Embodiment 2 to those in Embodiment 1 are designated by like reference signs and hence their detailed description is omitted.

The converter 5 includes all configuration components constituting the converter 1 and further includes a differential amplifier 51, switches 52 and 53, an AND circuit 54, a switching circuit 55, a capacitor C8, and a resistor R12. One end of the resistor R12 is connected to the positive terminal of the battery 3 and the minus terminal of the differential amplifier 51. The other end of the resistor R12 is connected to the drain of the FET 11, the cathode of the diode D1, the plus terminal of the differential amplifier 51, and one end of the capacitor C8. The other end of the capacitor C8 is connected to the negative terminal of the battery 3 and the source of the FET 12.

The output terminal of the differential amplifier 51 is connected to one end of switch 53. The other end of switch 53 is connected to one end of the switch 52 and to the feedback circuit 16. The output terminal of the differential amplifier 15 is connected to the other end of the switch 52. The two input terminals of the AND circuit 54 are connected respectively to the control part 17 and the delay device 20. The output terminal of the AND circuit 54 is connected to the gate of the FET 11.

The switching circuit 55 is provided with a first input terminal, a second input terminal, a third input terminal, and a fourth input terminal and four output terminals. The first input terminal is connected to the feedback circuit 16 and the input terminal of the inverter 19. The second input terminal is connected to the output terminal of the inverter 19. The third input terminal is connected to the output terminal of the inverter 18. The fourth input terminal is connected to the feedback circuit 16 and the input terminal of the inverter 18. The four output terminals of the switching circuit 55 are connected respectively to the delay devices 20, 21, 22, and 23.

The positive terminal of the battery 3 is connected through the resistor R12 to the drain of the FET 11 and the cathode of the diode D1. The output terminals of the differential amplifiers 15 and 51 are connected respectively through the switches 52 and 53 to the feedback circuit 16. The delay device 20 is connected through the AND circuit 54 to the gate of the FET 11.

When the voltage applied on the converter 5 by the storage battery 4 is to be converted, the capacitor C8 smoothes the voltage applied between the drain of the FET 11 and the source of the FET 12 and then applies the smoothed voltage through the resistor R12 on the battery 3.

The voltage across the resistor R1 amplified by the differential amplifier 15 is outputted from the differential amplifier 15 to the feedback circuit 16 through the switch 52. The differential amplifier 51 amplifies the voltage across the resistor R12 and then outputs the amplified voltage through the switch 53 to the feedback circuit 16. The voltage across the resistor R12 is proportional to the magnitude of the electric current that flows through the resistor R12 to the battery 3. Thus, the voltage outputted by the differential amplifier 51 becomes high/low in correspondence to the large/small of the output electric current that flows through the resistor R12 to the battery 3.

The switches 52 and 53 are respectively turned ON/OFF by the control part 17. In accordance with instruction from the control part 17, the switching circuit 55 switches connection between the four input terminals and the four output terminals.

In the AND circuit 54, a second adverse-flow prevention signal composed of voltages of high level and low level is inputted from the control part 17 to one input terminal. In the AND circuit 54, a voltage of high level or low level is inputted from the delay device 20 to the other input terminal. When the inputted second adverse-flow prevention signal is at a voltage of high level, the AND circuit 54 outputs the voltage of high level or low level inputted from the delay device 20, intact through the output terminal. Further, when the inputted second adverse-flow prevention signal is at a voltage of low level, the AND circuit 54 outputs a voltage of low level through the output terminal regardless of the voltage inputted from the delay device 20.

The AND circuit 54 outputs a voltage of high level or low level through the output terminal to the gate of the FET 11. When the AND circuit 54 outputs a voltage of high level, in the FET 11, a voltage at or more than a predetermined voltage is applied on the gate so that the FET 11 is turned ON. When the AND circuit 54 outputs a voltage of low level, in the FET 11, the voltage applied on the gate becomes less than the predetermined voltage so that the FET 11 is turned OFF.

When the voltage applied on the converter 5 by the battery 3 is to be converted and then the converted voltage is to be applied on the storage battery 4, the control part 17 sets the switches 52 and 53 to be ON and OFF respectively and maintains at a voltage of high level the second adverse-flow prevention signal to be inputted to one input terminal of the AND circuit 54. Further, the control part 17 instructs the switching circuit 55 to connect the first input terminal to the delay device 23, connect the second input terminal to the delay device 22, connect the third input terminal to the delay device 21, and connect the fourth input terminal to the delay device 20.

Thus, the converter 5 operates similarly to the converter 1 according to Embodiment 1. Accordingly, during the time that the voltage applied by the battery 3 is converted, the FETs 11, 12, 13, and 14 are turned ON/OFF individually so that no electric current flows through the diode D3. Thus, the loss in the electric power is small. Further, when conversion of the voltage applied by the battery 3 is to be terminated, in a state that the FET 13 is turned OFF, the electric current that flows through the resistor R1 to the storage battery 4 is reduced so that adverse flow is prevented.

During the time that voltage conversion is terminated, the control part 17 maintains the adverse-flow prevention signal at a voltage of low level and maintains the control signal at high level so as to maintain the FETs 11, 13, and 14 at OFF. This prevents a situation that an electric current flows from the battery 3 to the inductor L1 and a situation that an electric current flows from the storage battery 4 to the inductor L1, and hence prevents adverse flow of an electric current from the application side of the voltage to the inductor L1 and adverse flow of an electric current from the output side of the voltage to the inductor L1.

When the voltage applied on the converter 5 by the storage battery 4 is to be converted and then the converted voltage is to be applied on the battery 3, the control part 17 sets the switches 52 and 53 to be OFF and ON respectively and sets at a voltage of high level the adverse-flow prevention signal to be inputted to one input terminal of the AND circuit 24. Then, the control part 17 controls the second adverse-flow prevention signal similarly to the adverse-flow prevention signal of a case that the voltage applied by the battery 3 is to be converted.

Further, the control part 17 instructs the switching circuit 55 to connect the first input terminal to the delay device 21, connect the second input terminal to the delay device 20, connect the third input terminal to the delay device 23, and connect the fourth input terminal to the delay device 22.

Therefore, the FETs 11, 12, 13, and 14 and the diode D1 respectively operate similarly to the FETs 13, 14, 11, and 12 and the diode D3 of a case that the voltage applied by the battery 3 is to be converted. Further, the resistor R12 and the differential amplifier 51 respectively operate similarly to the resistor R1 and the differential amplifier 15 of a case that the voltage applied by the battery 3 is to be converted.

Thus, the converter 5 operates similarly to the converter 1 according to Embodiment 1. Accordingly, during the time that the voltage applied by the storage battery 4 is converted, the FETs 11, 12, 13, and 14 are turned ON/OFF individually so that no electric current flows through the diode D1. Thus, the loss in the electric power is low. Further, when conversion of the voltage applied by the storage battery 4 is to be terminated, in a state that the FET 11 is turned OFF, the electric current that flows through the resistor R12 to the battery 3 is reduced. Thus, adverse flow is prevented.

Further, during the time that voltage conversion is terminated, the control part 17 maintains the second adverse-flow prevention signal at a voltage of low level and maintains the control signal at high level so as to maintain the FETs 11, 12, and 13 at OFF. This prevents a situation that an electric current flows from the battery 3 to the inductor L1 and a situation that an electric current flows from the storage battery 4 to the inductor L1, and hence prevents adverse flow of an electric current from the application side of the voltage to the inductor L1 and adverse flow of an electric current from the output side of the voltage to the inductor L1.

Here, in Embodiments 1 and 2, it is sufficient for the FETs 11, 12, 13, and 14 to serve as switches alone. Thus, these are not limited to FETs of N-channel type and may be FETs of P-channel type. Further, bipolar transistors may be employed in place of the FETs 11, 12, 13, and 14. Further, the diodes D1, D2, D3, and D4 are not limited to parasitic diodes.

Further, during the time that conversion of the voltage applied by the battery 3 is terminated, it is sufficient that at least the FETs 11 and 13 are turned OFF. That is, the FET 14 need not be turned OFF. Similarly, during the time that conversion of the voltage applied by the storage battery 4 is terminated, it is sufficient that at least the FETs 11 and 13 are turned OFF. That is, the FET 12 need not be turned OFF.

Furthermore, the triangular waves W1 and W2 outputted from the control part 17 are not limited to sawtooth waves.

Further, when the voltage applied by the battery 3 is to be converted, the value concerning the output electric current that flows from the drain of the FET 13 through the resistor R1 to the storage battery 4 is not limited to the voltage outputted from the differential amplifier 15. For example, the value concerning the output electric current may be the value of electric current that flows from the drain of the FET 13 through the resistor R1 to the storage battery 4. Similarly, when the voltage applied by the storage battery 4 is to be converted, the value concerning the output electric current that flows from the drain of the FET 11 through the resistor R12 to the battery 3 is not limited to the voltage outputted from the differential amplifier 51. For example, the value concerning the output electric current may be the value of electric current that flows from the drain of the FET 11 through the resistor R12 to the battery 3.

Further, when the voltage applied by the battery 3 is to be converted, in correspondence to the large/small of the value concerning the output electric current that flows from the drain of the FET 13 through the resistor R1 to the storage battery 4, the duty of ON/OFF of each of the FETs 11 and 14 need not be adjusted to be small/large. For example, in correspondence to the large/small of the voltage applied across the storage battery 4, the duty of ON/OFF of each of the FETs 11 and 14 may be adjusted to be small/large. Similarly, when the voltage applied by the storage battery 4 is to be converted, in correspondence to the large/small of the value concerning the output electric current that flows from the drain of the FET 11 through the resistor R12 to the battery 3, the duty of ON/OFF of each of the FETs 13 and 12 need not be adjusted to be small/large. For example, in correspondence to the large/small of the voltage applied across the battery 3, the duty of ON/OFF of each of the FETs 13 and 12 may be adjusted to be small/large.

Further, ON/OFF of the FETs 11 and 12 and ON/OFF of the FETs 13 and 14 need not be synchronized with each other. In the converter 1 according to Embodiment 1, in a case that the FETs 11 and 12 are turned ON/OFF complementarily, regardless of the ON/OFF state of the FETs 13 and 14, the voltage applied on the converter 1 by the battery 3 can be stepped down. Further, in a case that the FETs 13 and 14 are turned ON/OFF complementarily, regardless of the ON/OFF state of the FETs 11 and 12, the voltage applied on the converter 1 by the battery 3 can be stepped up. In the converter 5 according to Embodiment 2, in a case that the voltage applied by the battery 3 is to be converted, similar description to that of the converter 1 is adoptable. Further, in a case that the voltage applied by the storage battery 4 is to be converted, when the FETs 13 and 14 are turned ON/OFF complementarily, regardless of the ON/OFF state of the FETs 11 and 12, the voltage applied by the storage battery 4 can be stepped down. Further, when the FETs 11 and 12 are turned ON/OFF complementarily, regardless of the ON/OFF state of the FETs 13 and 14, the voltage applied by the storage battery 4 can be stepped up.

Embodiments 1 and 2 having been disclosed shall be regarded as illustrative and not restrictive. The scope of the present invention is set forth by the claims not by the description given above. All modifications within the scope and the spirit of the claims shall be incorporated.

The invention claimed is:

1. A converter, comprising:
   an inductor;
   a first switch and a second switch, one end of each of which is connected to one end of the inductor;
   a third switch, one end of which is connected to the other end of the inductor;
   a fourth switch connected between the other ends of the inductor and the second switch; and
   a diode, anode and cathode of which are connected respectively to one end and the other end of the third switch;
   wherein the first switch, the second switch, the third switch and the fourth are turned ON/OFF individually so as to convert a voltage applied between the other ends of the first switch and the second switch,
   the converter further comprising a maintaining section that maintains OFF-state of the third switch when conversion of the voltage is to be terminated,
   wherein during a time that the maintaining section maintains OFF-state of the third switch, an electric current is reduced that flows between the other end of the third switch and the second-switch-side one end of the fourth switch,
   the converter further comprising:
   a semiconductor transistor having a first end, a second end, and a third end, a resistance between the first end and the second end becoming small/large in correspondence to high/low of a voltage applied on the third end;
   a resistor, one end of which is connected to the second end; and
   a capacitor, one end of which is connected to the third end,
   wherein a constant voltage is applied on the first end, and
   wherein small/large electric current is generated in correspondence to high/low of a voltage of a connection node between the semiconductor transistor and the resistor, and the electric current is decreased by switching a voltage applied on the third end from a first voltage to a second voltage higher than the first voltage.

2. The converter according to claim 1,
   wherein during a time that the conversion is terminated, the first switch and the third switch are maintained at OFF.

3. The converter according to claim 1,
   wherein the timing of switching of the ON/OFF of the first switch and the second switch is adjusted so that no time period is present that the first switch and the second switch are both ON.

4. The converter according to claim 1,
   wherein the timing of switching of the ON/OFF of the third switch and the fourth switch is adjusted so that no time period is present that the third switch and the fourth switch are both ON.

* * * * *